Oct. 24, 1950

E. P. SUNDHOLM 2,526,708

GREASE GUN LOADING PAIL BASE FOR GREASE
CONTAINERS, WITH CUTTER AND INTERLOCK
MEANS FOR SAID CONTAINERS

Filed Feb. 14, 1946

INVENTOR.
Edwin P. Sundholm
BY
Leonard L. Kalish
Attorney

Oct. 24, 1950 — E. P. SUNDHOLM — 2,526,708
GREASE GUN LOADING PAIL BASE FOR GREASE CONTAINERS, WITH CUTTER AND INTERLOCK MEANS FOR SAID CONTAINERS
Filed Feb. 14, 1946 — 8 Sheets-Sheet 2
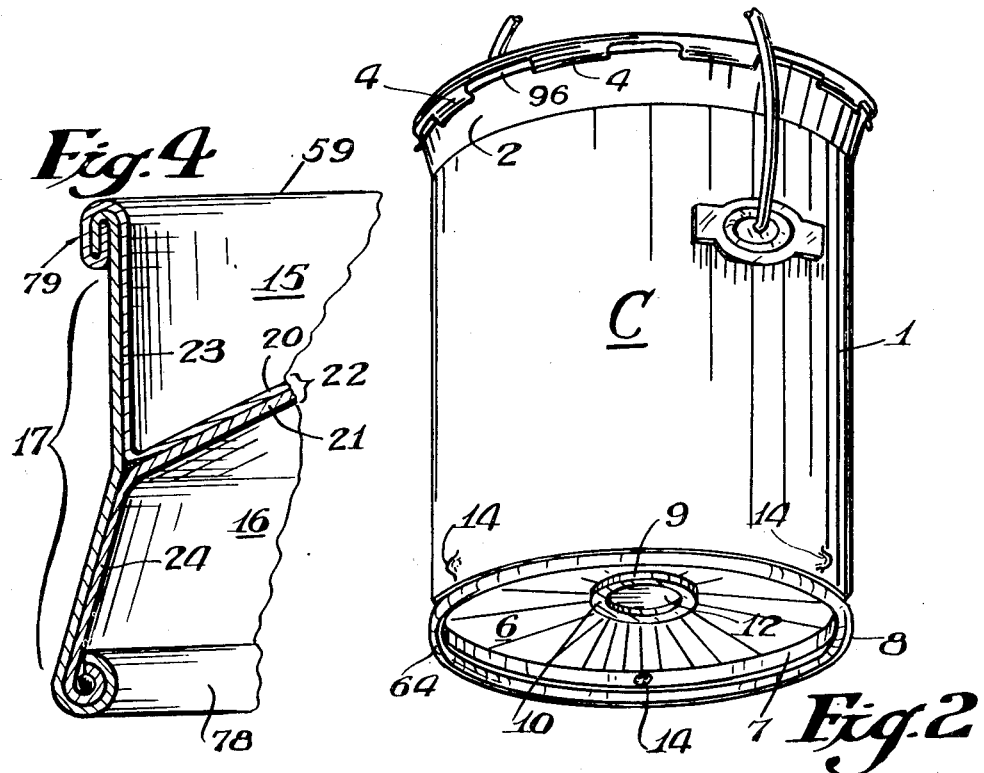
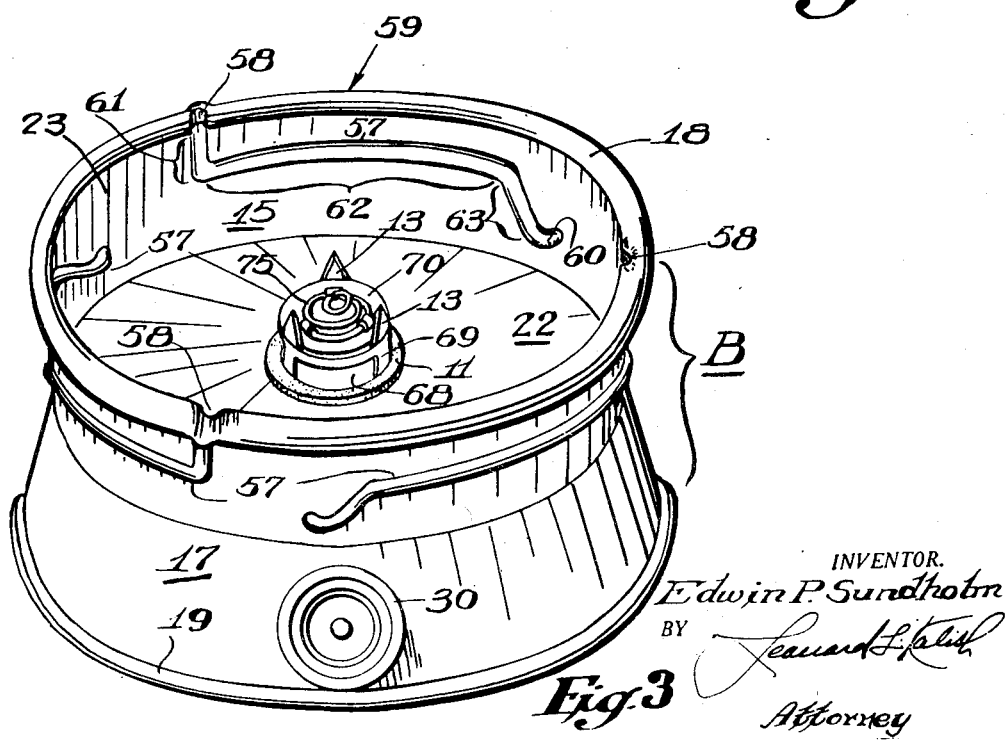
INVENTOR.
Edwin P. Sundholm
BY Leonard L. Kalish
Attorney Oct. 24, 1950     E. P. SUNDHOLM     2,526,708
GREASE GUN LOADING PAIL BASE FOR GREASE
CONTAINERS, WITH CUTTER AND INTERLOCK
MEANS FOR SAID CONTAINERS
Filed Feb. 14, 1946     8 Sheets-Sheet 3
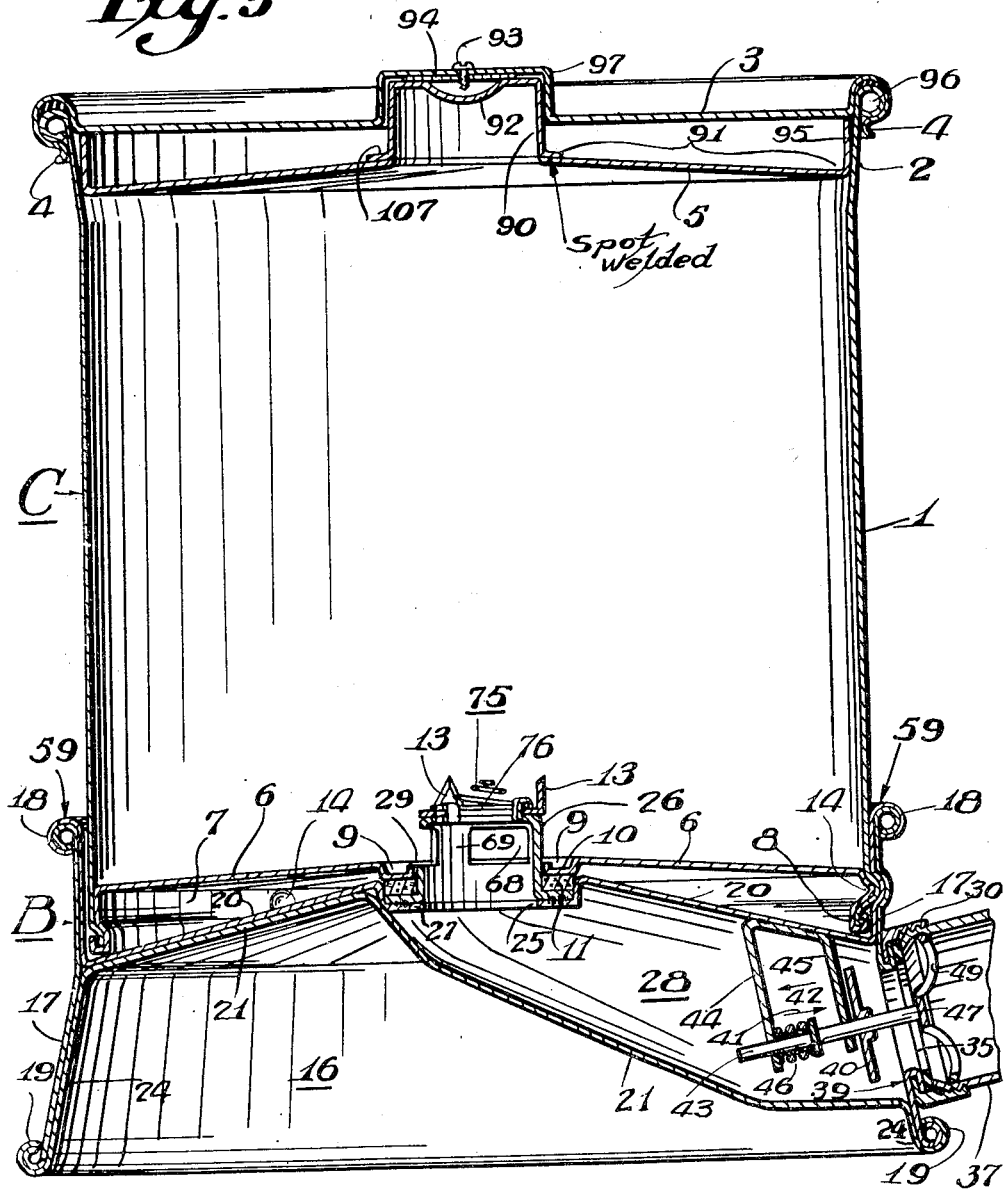
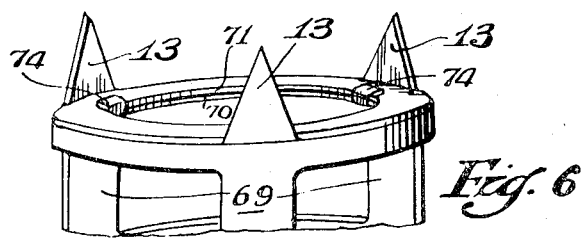
INVENTOR.
Edwin P. Sundholm
BY
Leonard L. Kalish
Attorney Oct. 24, 1950
E. P. SUNDHOLM
2,526,708
GREASE GUN LOADING PAIL BASE FOR GREASE
CONTAINERS, WITH CUTTER AND INTERLOCK
MEANS FOR SAID CONTAINERS
Filed Feb. 14, 1946
8 Sheets-Sheet 4
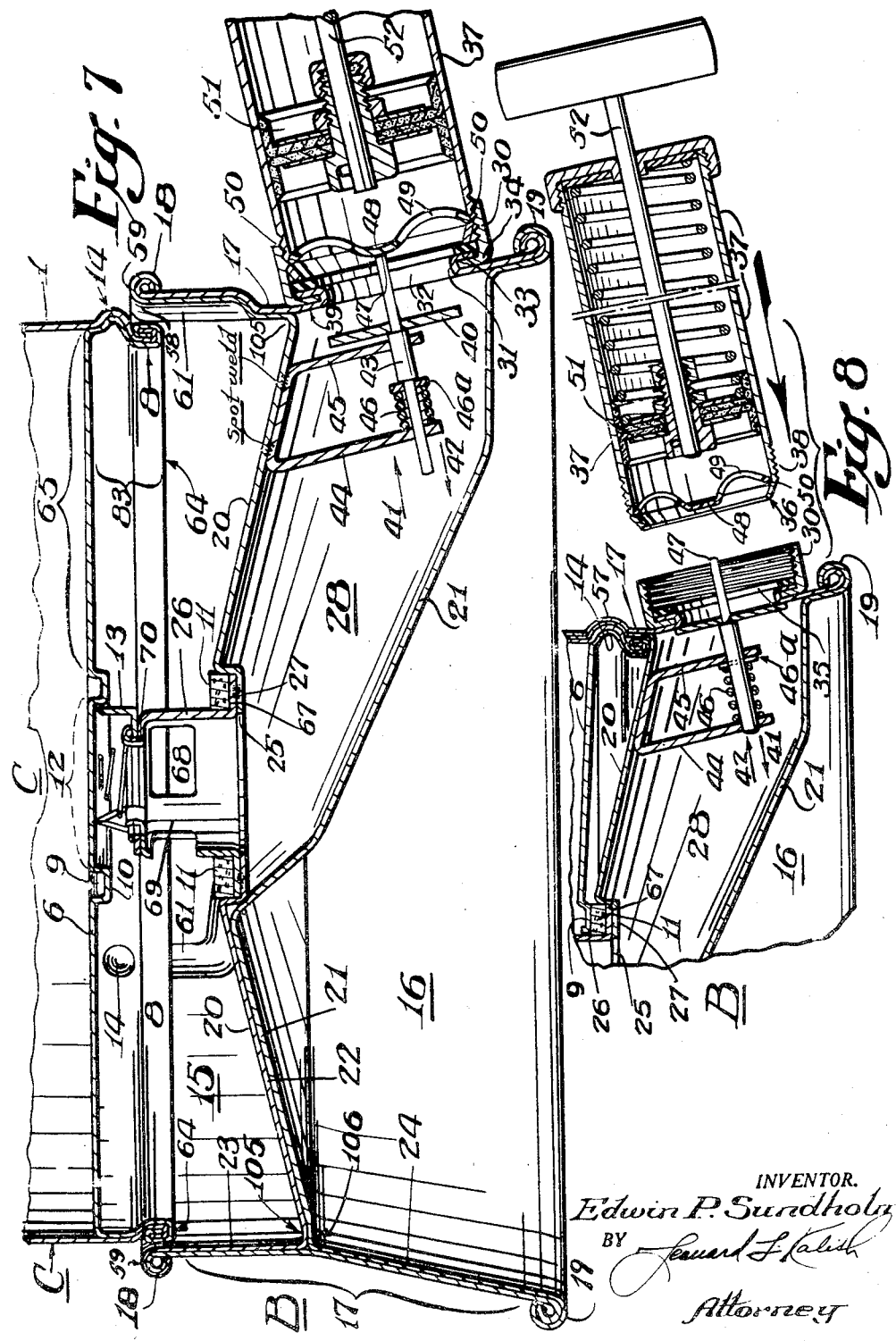
INVENTOR.
Edwin P. Sundholm
BY
Leonard L. Kalish
Attorney

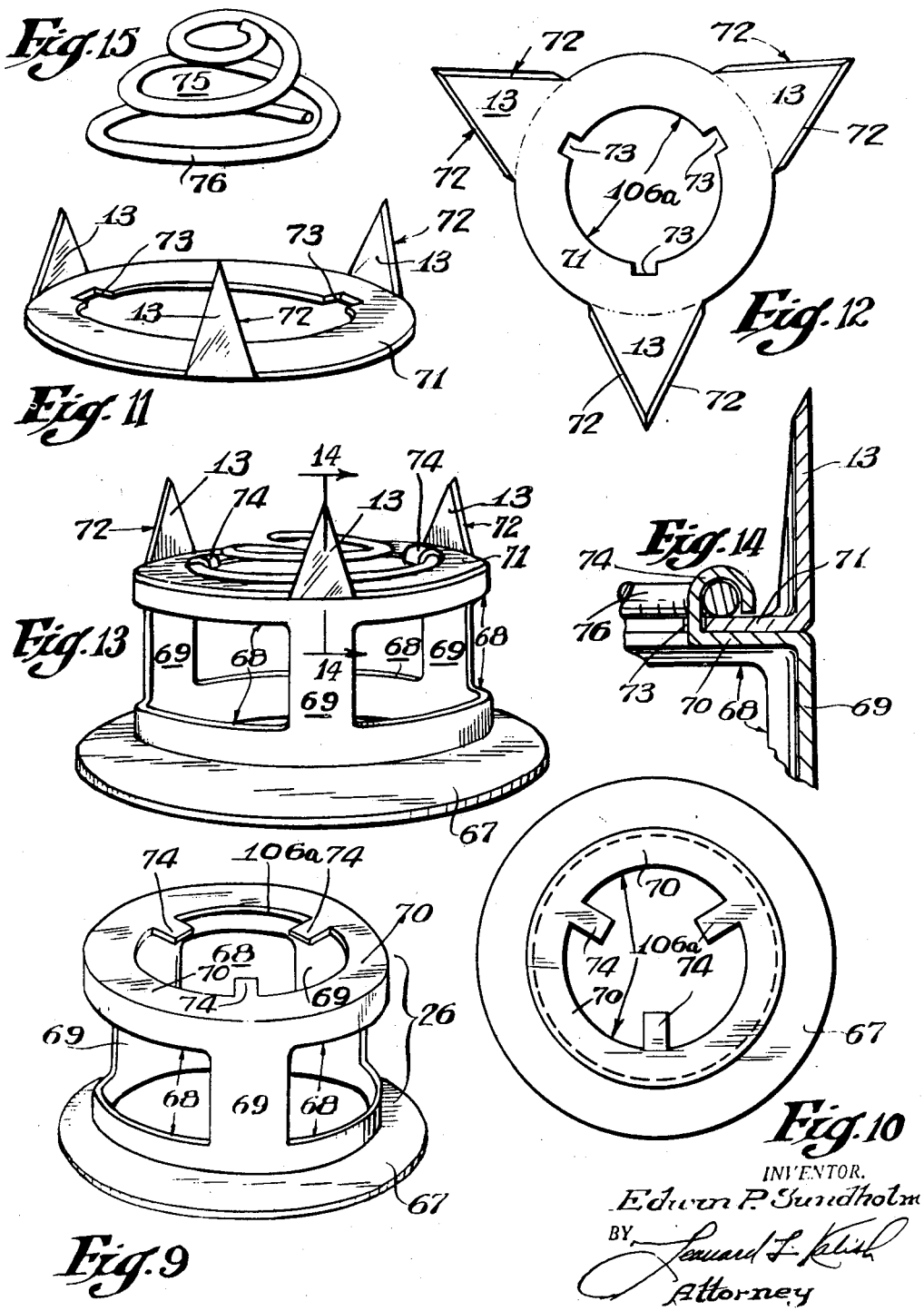

Oct. 24, 1950 E. P. SUNDHOLM 2,526,708
GREASE GUN LOADING PAIL BASE FOR GREASE
CONTAINERS, WITH CUTTER AND INTERLOCK
MEANS FOR SAID CONTAINERS
Filed Feb. 14, 1946 8 Sheets-Sheet 6
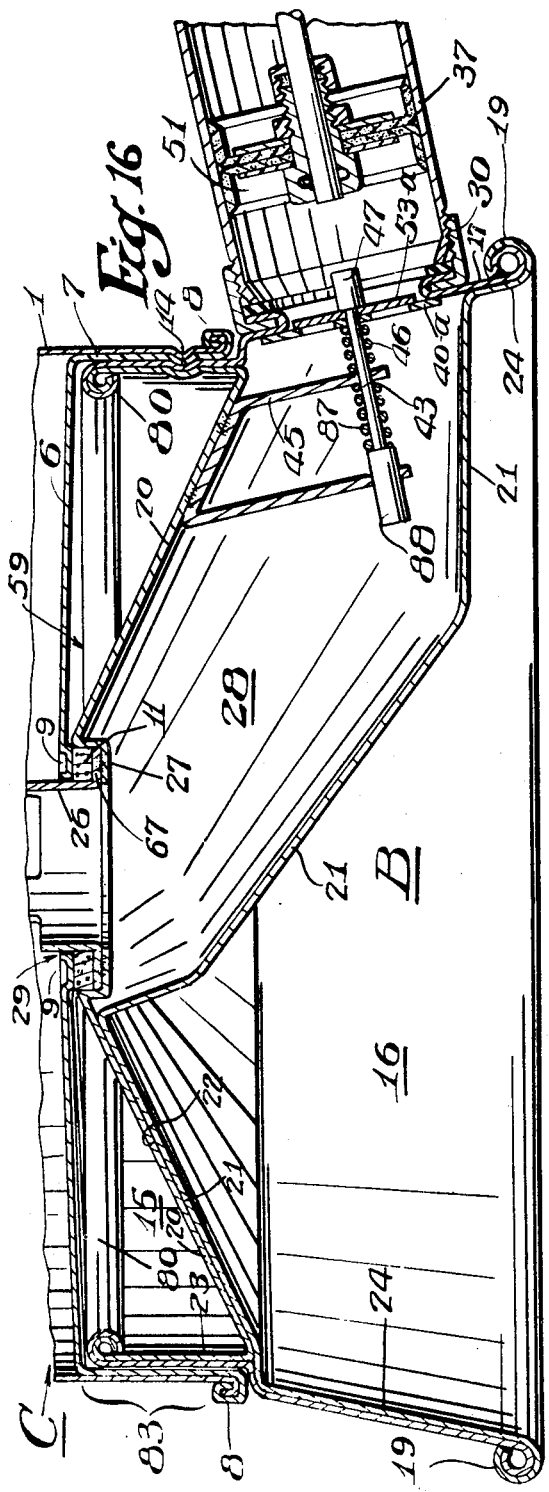
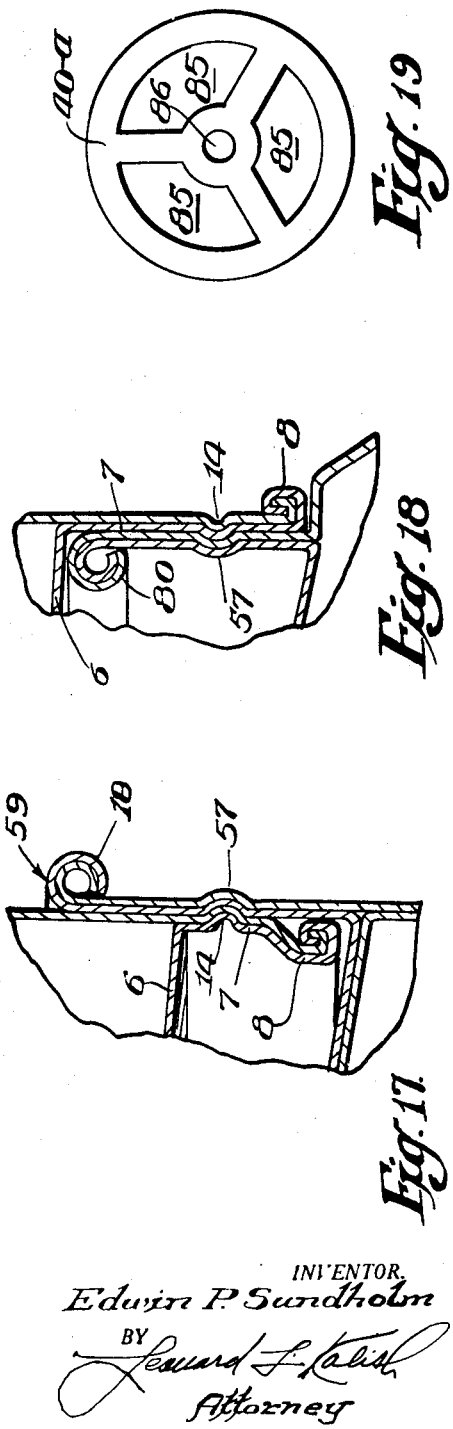
INVENTOR.
Edwin P. Sundholm
BY Leonard L. Kalish
Attorney

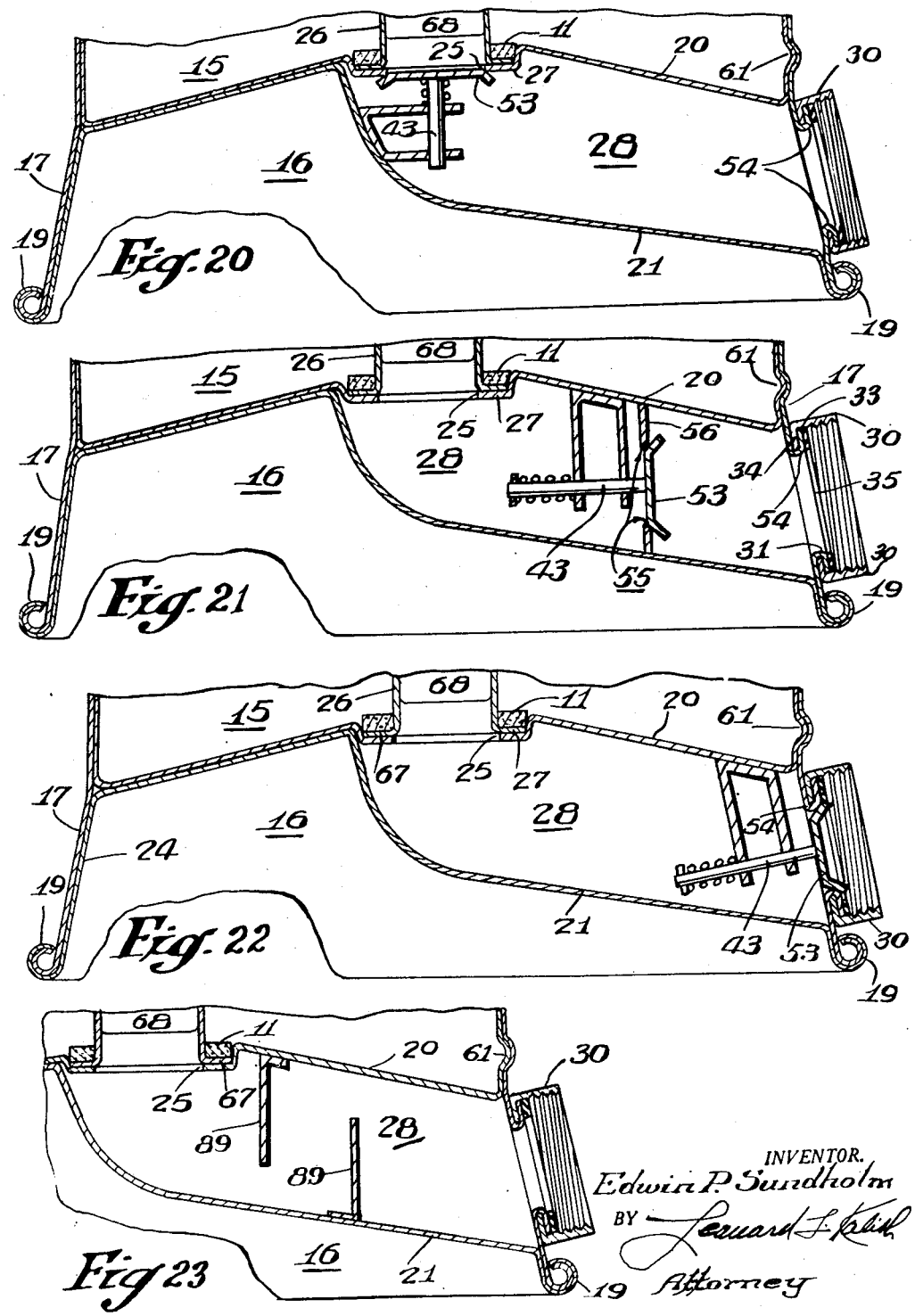

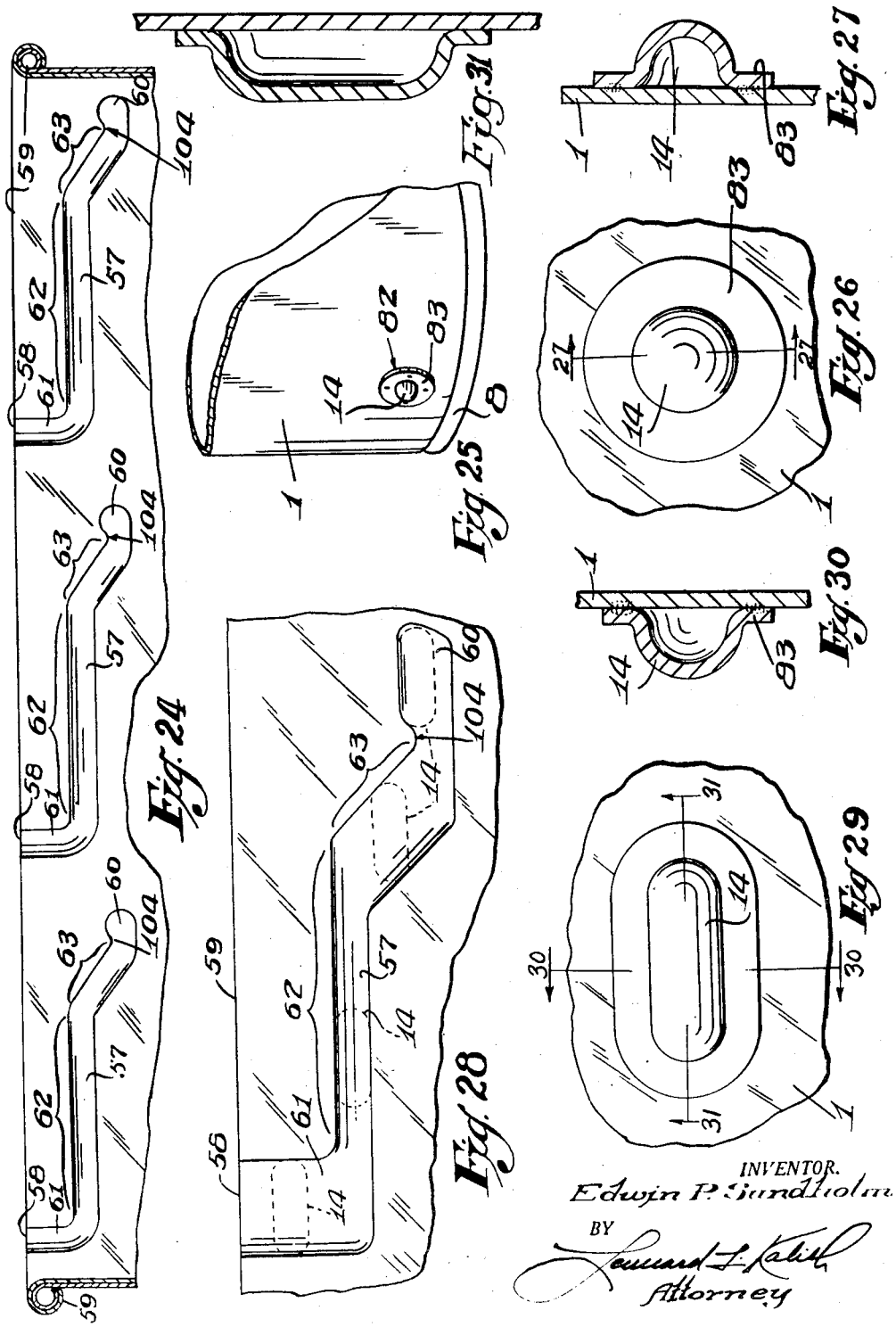

Patented Oct. 24, 1950

2,526,708

UNITED STATES PATENT OFFICE 2,526,708

GREASE GUN LOADING PAIL BASE FOR GREASE CONTAINERS, WITH CUTTER AND INTERLOCK MEANS FOR SAID CONTAINERS

Edwin P. Sundholm, Albert City, Iowa, assignor to Our Savior's Evangelical Lutheran Church, Albert City, Iowa, a corporation of Iowa Application February 14, 1946, Serial No. 647,447

15 Claims. (Cl. 226—125)

The present invention relates to a certain new and useful grease-gun-loading pail-base or pump-loading pail-base, for receiving, at its top, an original and relatively thin-walled and inexpensive vendable merchandising container (namely, a container in which the fluid or semi-fluid is originally packed, shipped, stored and sold), as, for instance, an original thin-walled sheet-metal pail of lubricant (such as grease or viscous oil) or of printers' ink, caulking compound, etc., and for receiving, at its side, the reservoir-barrel of a grease-gun or the like or a pump-cylinder, whereby the lubricant or other viscous fluid may be conveniently loaded directly from the original container into the reservoir-barrel of the grease-gun or into the pump-cylinder through the intervention of the gun-loading pail-base of the present invention.

One of the objects of the present invention is to suction-dispense such viscous fluids, as, for instance, lubricants, from an original merchandising container, vented at its top, through an opening in the bottom thereof (either with or without the need of removing the lid or top of the container) as, for instance, for dispensing such more or less viscous fluids or semi-fluids through an opening in the bottom of a sheet-metal container such as a 15 lb, 25 lb. or 40 lb. (more or less) capacity pail, can or the like, preferably with bail-like carrying-handle, by mounting such sheet-metal container or a dispensing-base or gun-loading pail-base or transfer-base which has a conduit or fluid passage-way therethrough, with one terminal of the conduit generally in the center of the top of the base, and with the other terminal of the said passage-way in or on the side-wall of the base, and with the upper conduit-terminal arranged sealingly to engage the relatively small opening in the bottom of the pail or original container and with the side-terminal of said conduit communicating with a socket-like coupler for making detachable connection with the barrel or reservoir of a grease-gun or the like suction-producing device or for connection with any other lubricant-dispensing pump or the like and means intermediate the dispensing-base and the sheet-metal container for making temporary interlocking engagement between the two, and for firmly securing the container to the base.

Other objects of the present invention will appear from the following description and the accompanying drawings, wherein I have shown, for the purpose of illustrating my invention, forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings, in which like reference characters indicate like parts, Figure 1 represents a perspective view of one embodiment of the present invention, partly broken away and sectioned.

Figure 2 represents a perspective view of one embodiment of an original merchandising container, of the can phase of the present invention.

Figure 3 represents a perspective view of one embodiment of a dispensing-base of the base phase of the present invention.

Figure 4 represents a fragmentary cross-sectional view of the top and bottom flanges of the dispensing-base, showing a modified form of base construction, in respect to the union or assembly of the top and bottom flanges and the outer side-wall member which unites the top and bottom flanges.

Figure 5 represents a vertical cross-sectional view on line 5—5 of Figure 1, showing the container applied to the base, with a hole cut into the bottom of the container and with the periphery of the hole sealed against the base, and with the bottom of the container dished upwardly by the tensioning effect of the interlocking and sealing engagement between can and base.

Figure 6 represents a fragmentary perspective view of the cutter and intake assembly similar to that shown in Figure 5, but on a somewhat larger scale, but without any disc-ejector spring (such as is shown in Figure 5).

Figure 7 represents a vertical cross-sectional view of the base and of the lower portion of the pail or can, similar to that shown in Figure 5 (but on a somewhat larger scale), with the can shown approximately in the position just before the bottom of the can is dished upwardly by the cutter-pressure, and just before the cutters pierce the bottom of the can.

Figure 1:
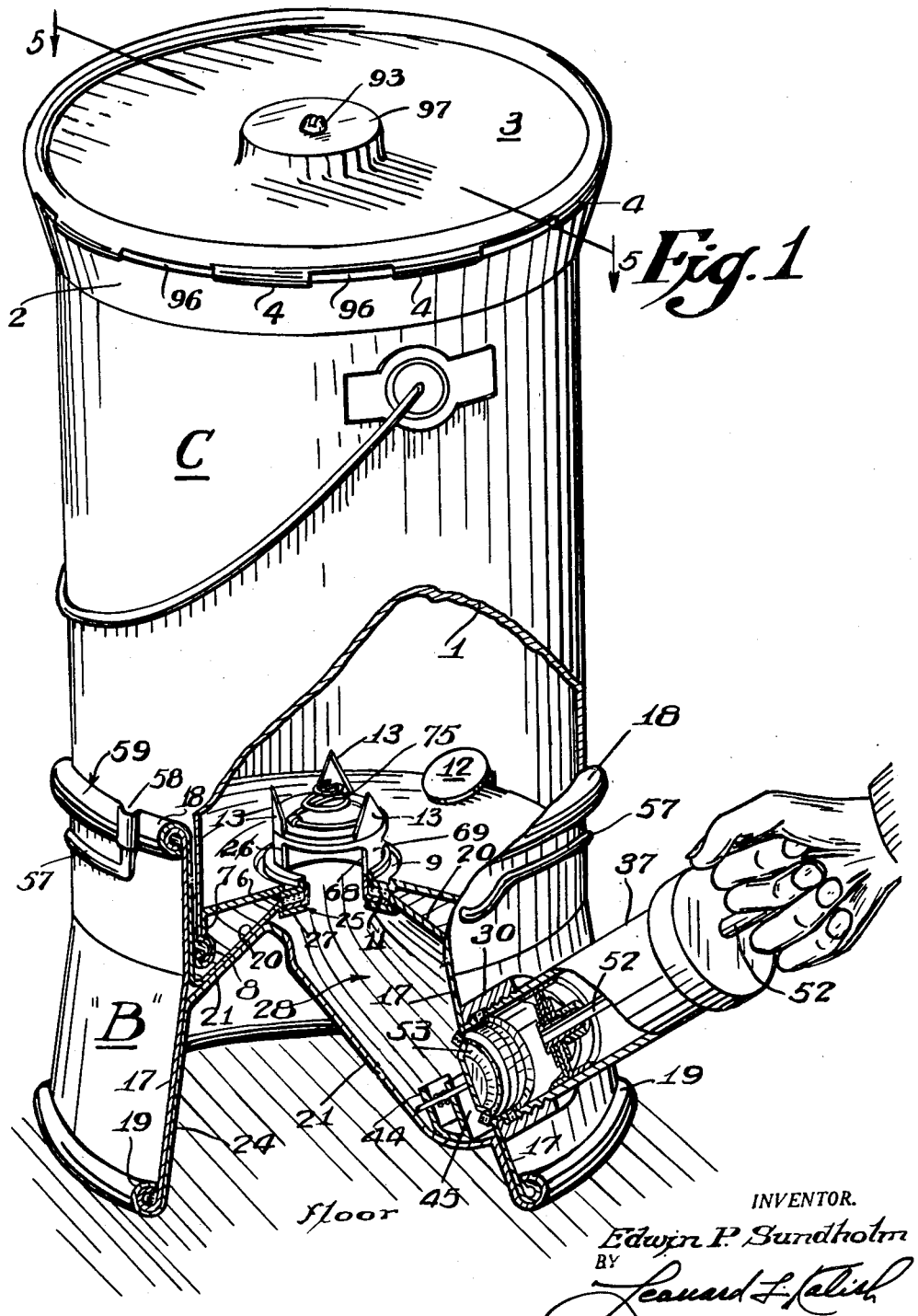

Figure 8 represents a fragmentary cross-sectional view of the base and bottom of the can (similar to that shown in Figures 1, 5 and 7) and of the end of the grease-gun barrel, shown in the position just before the grease-gun barrel has entered the gun-receiving socket of the base, or in a position just after the grease-gun barrel has been withdrawn from the socket (and with the valve in the base in the closed position).

Figures 9 to 15 inclusive show the various parts and the assembly of the cutter and intake assembly, which may be a part of the base in the embodiment of the invention herein shown, namely:

Figure 9 shows a perspective view of one embodiment of the cutter-supporting intake member, before the clamping lugs thereof have been bent over, Figure 10 shows a top plan view of this cutter-supporting intake member, Figure 11 shows a perspective view of the multi-bladed cutter member, itself, with its three cutting points, Figure 12 shows a plan view of the flat sheet-steel stamped blank for the cutter member, before the cutters thereof have been bent up into a position at right angle to annulus thereof, Figure 13 shows a perspective view of the assembled intake member and cutter member, Figure 14 represents a section on line 14—14 of Figure 13, on an enlarged scale, and Figure 15 represents a perspective view of one form of disc-ejector spring which may be used in the center of the cutter member, for ejecting the sheet-metal discs which the cutters cut out of the bottom of the sheet-metal can (but without which ejector spring the the device may also be used).

Figure 16 represents a vertical cross-sectional view of the base and the lower part of the container, in another embodiment of the present invention, in which the bottom of the container telescopes over the upper flange of the base, and surrounds it exteriorly, and in which the socket-closing valve is capable of being opened both by the mechanical action of the grease-gun barrel as well as by fluid-pressure incident to the suction of the grease-gun barrel.

Figure 17 represents a fragmentary cross-sectional view through the can-engaging upper flange of the base and through the lower part of the container, similar to that shown in Figures 1 and 9, but on an enlarged scale, better to show the interaction between one of the bayonet-type grooves of the base and one of the bayonet-lugs of the can.

Figure 18 represents a fragmentary cross-sectional view through the can-engaging upper flange of the base and through the lower part of the container, of the form of construction shown in Figure 16, but on an enlarged scale, better to show the interaction between one of the bayonet-type grooves of the base and one of the bayonet-lugs of the can.

Figure 19 represents a plan view of the inner valve disc of the dual-acting valve construction shown in Figure 16.

Figure 20 represents a vertical cross-sectional view of a modified form of construction of base, in which a fluid-pressure actuated valve is placed near the upper intake end of the fluid conduit in the base.

Figure 21 represents a vertical cross-sectional view of a modified form of construction of base, in which a fluid-pressure actuated valve is placed in the conduit of the base intermediate the intake and outlet ends thereof.

Figure 22 represents a vertical cross-sectional view of a modified form of construction of base, in which a fluid-pressure actuated (or suction-actuated) valve is disposed in the gun-receiving socket.

Figure 23 represents a vertical cross-sectional view of a modified form of construction of base, in which a flow-resistant baffle or baffles are placed in the conduit, in lieu of a valve, to prevent the free flow of fluid.

Figure 24 represents a plan type development of the three bayonet grooves of the upper flange of the base, of the forms shown in Figures 1, 3, 5, 7 and 16, with the entire circumference of the flange of the base spread out flat to show the relationship of the three bayonet slots to each other and to show their general contour.

Figure 25 represents a fragmentary perspective view of the bottom of a container showing a spot-welded bayonet-lug member.

Figure 26 represents a fragmentary front elevational view of the spot-welded bayonet-lug member shown in Figure 25, on an enlarged scale.

Figure 27 represents a section on line 27—27 of Figure 26.

Figure 28 shows a development-layout of a modified form of bayonet slot adapted to receive an elongated type of bayonet lug indicated in Figures 29, 30 and 31.

Figure 29 represents a front elevational view of an elongated bayonet lug, at the bottom of a can, which may be spot-welded thereto or which may be pressed into or outward from the bottom of the can (and integrally therewith).

Figure 30 represents a section on line 30—30 of Figure 29.

Figure 31 represents a section on line 31—31 of Figure 29.

The thin-walled original vendable merchandising sheet-metal container, pail or can designated generally by the letter "C" and shown in Figures 1, 2, 5 and 7, is formed with a cylindrical sidewall 1 having its uppermost portion 2 flared outwardly slightly and having a lid or cover 3 secured to the upper flared and beaded end thereof either by means of the crimped tabs 4 or by any suitable means.

The bottom 6, of the container C, is provided with a downwardly depending more or less cylindrical flange-like portion 7, which telescopes into the lower end of the cylindrical body 1 of the container C, to a greater or lesser extent, depending upon the axial length of flange 7, and is secured thereto by an interlocking crimped seam 8.

The sheet-metal bottom 6, of the container C, may have pressed into it, in a downward direction (or in an upward direction), an annular groove 9, to form a doughnut-like ridge or annulus on the outside (or on the inside) of the bottom 6; the outer (or inner) more or less flat or rounded annulus-like surface 10 of which constitutes a seating-surface for making sealing-contact with an annular sealing-gasket or ring 11 (of cork, grease-resistant rubber or composition or other suitable resilient material) carried by the base "B." The annulus 9 is preferably centered, or approximately centered, in relation to the periphery of the bottom 6 of the container C.

The annulus 9 also serves to stiffen the center of the bottom 6, so that the circular disc-like portion 12, within the center of the annulus 9, can be more readily cut out or knocked out by the cutting action of the cutters (as in the embodiment herein shown and described) or by any other suitable disc-removal operation. The annulus 9 also serves to center or guide the cutters or knives 13, during the cutting operation, and serves also to stiffen and reinforce the center of the bottom 6 after the disc 12 has been cut out or removed therefrom.

The container may be of relatively thin sheet-steel or "plate," as, for instance, 26 gauge sheet-steel or "plate" (approximately .018 inch thickness) for a 25 lb. pail or 30 gauge for a 10 lb. container or 24 gauge for a 50 lb. container.

In one embodiment of my invention, a plurality (2, 3 or 4, more or less) of circumferentially distributed equidistant bayonet-lugs 14 may be pressed outwardly (or inwardly) from the side-wall 1 of the container C, for interlocking connection with the base B.

Within the container C, near its upper end thereof, is a "follower" 5, which (in one embodiment) is held to the lid 3, while the container C is filled and while the container C is in transit and in storage, prior to its actual use, by means of the screw 93 or the like, in the manner hereinafter described, and which is released from the lid 3 when the container is put into use on the base B.

In one embodiment of the base phase of my present invention, illustrated in the drawings, the base "B" may be formed of three members 15, 16 and 17 (see Figure 7, which may be welded to each other or may be interlocked by seams 18 and 19, so as to form a generally unitary construction, in which each member supports and gives rigidity to the other, thereby permitting the three members to be formed (by pressing between dies or by spinning or by rolling, or the like) out of relatively thin sheet-steel as, for instance, 20 or 22 gauge sheet-steel for a base for a 25 lb. container) or other relatively thin sheet-metal and yet maintaining adequate strength and rigidity in the finished base "B."

The upper and lower base-members 15 and 16, respectively, are generally "dish" shaped, while the outer member 17 is a generally hoop-like member which unites the other two, and serves also to stiffen the other two; the members 15 and 16 being arranged with their transverse portions or "bottoms" in juxtaposition and in generally contiguous relation to each other, that is, with the bottom 20 of the upper member 15 extending downwardly and with the bottom 21 of the lower member 16 extending upwardly, thereby reinforcing each other to give the desired rigidity to the composite of two-ply partition-wall designated generally by the numeral 22.

The cylindrical portions 23 and 24, respectively, of the members 15 and 16, may be either the same diameter or of different diameters, or either or both of them may be "stepped" in several diameters or tapered, in the form of a truncated cone. In the embodiment of the invention herein shown, the upper flange 23 is cylindrical, while the upper diameter of the lower flange 24 is substantially the same as that of the flange 23, and the lower flange tapers outwardly in the form of a truncated cone.

The outer hoop-like member 17 may be made by curving a strip of flat sheet-metal into a hoop-like circle and welding or otherwise securing the ends of the strip to each other, and may be made approximately to fit the diameter or diameters or "steps" or taper of the peripheral or flange-like portions 23 and 24 of members 15 and 16, or it may be spaced away therefrom in an outwardly direction, throughout (or over part of) its extent. In the forms shown, the member 17 is in generally contiguous relation to the sides or flange-like portions 23 and 24 of the members 15 or 16.

In the end-wall or "bottom" 20, a center aperture 25 is formed, and the material from the aperture 25 may be pressed or drawn upwardly to form a short upstanding tube-like cutter-supporting intake-flange or intake member 26, although this tube-like cutter-supporting intake-flange or intake member is preferably formed separately, as shown in the drawings, and spot-welded or crimp-seamed to the aperture 25. The metal around the hole 25 may be pressed down in a downwardly extending annulus 27, forming an annular groove around the tube-like flange 26, for the reception and retention of the resilient and grease-resistant packing-gasket or sealing-ring 11.

From the partition-wall or "bottom" 21 of the lower base member 16, radial channel 28, of more or less U-shaped cross-section, is pressed, in a downward direction, from a point which includes the projected area of the hole 25 (and may also include the projected area of the annulus 27), which channel 28 extends laterally outwardly to the side-wall 24 of the member 16, at one point, so as to form a fluid-conducting passageway or conduit in communication with the hole 29 which is ultimately formed in the bottom of the original container, pail or can "C," within the annulus 9 thereof, outwardly to the gun-receiving socket 30 formed in or affixed to the side of the member 17.

From the more or less cylindrical member 17, a circular flange 31 is drawn or pressed outwardly, in general alignment with the outer end of the passage-way or conduit 28, and preferably turned upwardly at a slight angle, so that the plane of its outer edge will be inclined upwardly slightly from the vertical. The circular center portion of the flange 31 is cut out, and the generally tubular flange 31 is thereafter crimped or flared outwardly as at 33, to overlap and interlock with the inturned flange 34 of the gun-receiving socket 30; the crimped portion 33 of the tubular-drawn flange 31 serving also as a seat for the sealing gasket 35 against which the end 36 of the barrel or reservoir 37 of the grease-gun is adapted sealingly to bear, when its screw-threaded end 38 is screwed into the internally screw-threaded cylindrical portion of the gun-receiving socket 30.

The inner surface 39 of the flat, transverse, portion may also serve as a valve-seat, against which a round shut-off valve 40 is adapted to seat in a direction of the arrow 41, and from which it is unseated in the direction of the arrow 42. The shut-off valve 40 may be carried by a valve-stem or rod 43 which may be guided by a pair of journal brackets 44 and 45 fastened (by spot welding or otherwise) to the wall 20, and which is urged into a seating position by helical compression spring 46 which bears against a cross-pin, disc or other abutment 46—a affixed to the rod 43. The other end of the valve-stem 43 carries an operating extension 47, which extends outwardly to a suitable distance, so that it may be contactingly engaged by the multi-spoked button 48 which is more or less fixedly carried in the front end of the grease-gun barrel or pump-cylinder 37. The button 48 may be held by the spokes 49 which may be held in place by being spread out into an annular groove 50 formed in the inner surface of the outer end of the gun-barrel 37, or may be otherwise secured in the barrel 37, as, for instance, by butt-welding the ends of the spokes 49 as, for instance, by electrical-resistance heat or "resistance-welding" to the inner side-wall of the barrel 37 by unbending the bowed portions of the spokes 49 to spread the ends thereof into firm contact with the cylinder 37 while welding-current is connected across the spokes and barrel, or by spot-welding the ends of the spokes which have been previously bent parallel to the side-wall of the barrel 37.

Thus, when the gun barrel or pump 37 is screwed into the socket 30, the button or center portion 48, intervening the spokes 49, presses the valve-extension 47 inwardly so as to unseat the valve 40 and to permit the lubricant to be drawn out by the manual retraction of the piston 51 within the barrel or cylinder 37, by the manually operable retracting rod or piston rod 52, or by the suction of any other pump-piston.

Instead of the inwardly and mechanically unseating valve 40, I may provide a suction-unseating valve 53, shown in Figures 20, 21 and 22, opening outwardly or generally in the direction of the fluid-flow, which may be similarly affixed to and carried by a similar valve-rod 43 and journal or bearing brackets 44 and 45, and seated by a spring 46, but this time against the outer turned periphery 54 of the tubular flange 31, as in Figure 22 or against the inner periphery of the hole 25, as in Figure 20, or against the inner periphery of a valve-hole 55 in the valve-seat wall 56 interposed in the conduit 28, as in Figure 21. Either valve, namely, the inwardly and mechanically unseated valve 40, or the outwardly suction-unseated valve 53, may be placed within the channel 28 or at the opening 25.

Instead of a rod-carried valve (40 or 53), with rectilinear unseating motion, I may use a flapper-type hinged or pivoted valve, pivoted at its top, for gravity-seating or pivoted either at its top or bottom, or at its sides, and seated by any suitable valve-closing spring.

Into the cylindrical side 23 of the upper dish-like base-member 15, and, if desired, also into the co-extensive cylindrical zone of the hoop-like outer member 17, a plurality (two, three or four) of circumferentially distributed and equidistant similar bayonet-grooves or channels 57 are pressed (or otherwise formed) in an outwardly direction (as in Figures 1, 3, 5, 7 and 17) or in an inward direction (as in Figures 16 and 18), with their outer ends 58 passing through the upper edge 59 and with their lower inner ends 60 "blind."

Each of the bayonet-grooves or channels preferably has a more or less vertical entrance position 61 of a length such that the traverse of the bayonet-lugs 14 downwardly therethrough is sufficient to cause the cutters 13 fully to pierce and fully to extend through the bottom of the container C; the upper edge 59 being so spaced in relation to the ends of the cutters 13 that the extreme ends of the cutters will not quite contact or at least will not pierce the sheet-metal of the bottom of the container C while the lower surfaces of the bayonet-lugs 14 are riding on the upper edge 59 of the base B, or are at the plane of the edge 59, and so that the bayonet-lugs 14 must enter the more or less upright portions 61 of the bayonet-channels 57 before the cutters 13 can effectively engage or pierce the bottom of the container C.

The bayonet-channels 57 have more or less horizontal portions 62, through which the bayonet-lugs 14 pass by rotating the container, after the cutters 13 have been pushed through the bottom of the container, so as to cause the pushed-through cutters circularly to cut through the bottom, or to make a complete circular cut, and thus to make a complete circular hole 29.

The length of the more or less horizontal "cutting" portions 62 of the bayonet-channels 57 depend upon the number of cutters and their arcuate extent. Thus, the amount of turning of the can required for a full cut-out, is that fraction of a turn which will cause the leading edge of one cutter arcuately to travel through the metal (of the bottom) until it meets the initially-pierced hole left behind by the cutter ahead of it. The greater the number of cutters in the circle, or the greater the arcuate width of the base of the cutters, the less turning is required, and, hence, the shorter the portions 62 of the bayonet channels 57. Preferably, the length of the portions 62 of the bayonet-channels 57 is just slightly greater than minimum turning required, so as to give a slight margin of clearance and thus to insure a full circular cut-out.

The bayonet-channels 57 then dip downwardly at a suitable angle as at 63 (see Figures 24 and 28) so as to pull the can downwardly after the hole 29 has been fully cut in its bottom, and thereby sealingly to seat the reinforced and stiffened annular sealing-surface 10 (surrounding the cut hole 29) against the sealing gasket 11 and so as also to seat (or nearly seat) the seamed and beaded bottom edge 64 against the more or less horizontal transverse surface 20 of the upper dish-like base-member 15. The annular portion 65 of the bottom of the can or container C (Figure 5) is resilient so as to permit the doughnut-like reinforcing portion 9 (of the bottom 6) and the seating-annulus 10 thereof, to be displaced, to an appreciable extent ($\frac{1}{16}$" or $\frac{1}{8}$", more or less), in a generally axial direction. The upper and lower ends of the inclined portions 63 of the bayonet-channels 57 are so positioned, vertically, in relation to the outer portion of the wall 20 of the base-member 15 which contacts (or is in vertical alignment with) the lower beaded edge 64 of the can, that the relative vertical disposition or spacing of the seating-surface 10 and of the upper surface of the more or less resilient sealing-gasket 11, in relation to the upper and lower ends of the inclined portions 63 of the bayonet-channels 57, is such that the annular seating-surface 10 is brought into contact with the upper surface of sealing-gasket 11 before the bayonet-lugs 14 have travelled down the entire length of the inclined portions 63, so that the continued downward inclination of portions 63 causes the annular portion 65 of the bottom 6 of the can C to be forced upwardly so as to exert a resilient spring-like force which will maintain effective contact-pressure between the annular seating-surface 10 and the sealing-gasket 11 when the bayonet-lugs 14 have travelled all the way down the inclines 63 and have receded slightly (in an upward direction) into the slightly upturned terminal portions 60 of the bayonet-channels 57; this slight reverse-turn serving as an over-lock, while the upward force exerted upon the whole can C (by the upwardly dished and tensioned bottom of the can) tends to keep the bayonet-lugs 14 in the slightly upturned terminal portions 60 so as to prevent accidental unlatching or unlocking of the can C from the base B. The sealing-gasket 11 is also preferably resilient, so as to provide a further "take-up" of any slack or clearance which might otherwise exist in the locked position of the can C and base B.

The basal portions of the can C (namely the vertical disposition of the seating-surface 10 thereof and the lower edge 64 thereof and the bayonet-lugs 14 thereof) may be so arranged, proportioned or disposed in relation to each other and in relation to the corresponding partition of the base, that the lower edge 64 of the skirt of the can will seat or "bottom" against the juxtaposed outer peripheral portion of the partition wall 20 of the upper base-member 15, when the can is in its finally "locked" position on the base, or these elements may be so disposed or proportioned in relation to each other, that the lower edge 64 of the "skirt" of the can will not quite "seat" or "bottom" on the base (as indicated in Figure 1), but so that the can will be "bottomed" on the base only on the sealing surface 10 thereof, and so that the can will be held fully "tensioned" between the sealing-surface 10 thereof and the bayonet-lugs 14 thereof (as indicated in Figure 17); the base pushing upwardly on the sealing-surface 10 of the can and pulling downwardly on the bayonet-lugs 14 of the can, with the resiliency of the annular portion 65 of the bottom 6 of the can serving as the tension means to keep the bayonet-lugs pulled upwardly into the upper-turned terminal portions 60 of the bayonet-channels 57 of the base.

I may also so arrange the basal portions of the can C (namely, the height of the bayonet-lugs 14 relative to the lower edge 64 of the can) and the can-receiving portions of the base B (namely, the height of the lowermost portions 104 of the bayonet-grooves or channels 57 in relation to the outermost annular portion 105 of the upper dish-like member 15 of the base B), and the relative height of the sealing-seat 10 in relation to the gasket 11, that the sealing seat 10 will be firmly seated against the gasket 11 under the influence of the tension created in the annular portion 65 of the bottom of the can, when it is dished upwardly by the sealing pressure between 10 and 11, and yet so as to permit the lowermost edge 64 of the can to seat against the annular portion 105 of the base when the bayonet-lugs 14 have receded slightly into the slightly up-turned portions 60 of the bayonet-channels 57. This I may do by means of the lateral resiliency or "give" between the bayonet-lugs 14 and the bayonet-channels 57, and by having the bayonet-lugs 14 formed as gradually curved members, instead of defining a sharp or distinct horizontal surface, and by having the portions 62, 63, 104 and 60 of the bayonet-channels 57 also gradually curved in vertical cross-section, so that when the lowermost edge 64 of the can has seated firmly against the annular surface 105 of the base B, just before the bayonet-lugs 14 ride past the lowermost points 104 of the bayonet-channels 57, the can may, nevertheless, be turned further so as to bring the bayonet-lugs 14 past the lowermost points 104 of the bayonet-channels 57, into the up-turned portions 60 of this bayonet-channel, by causing the bayonet-lugs and the bayonet-channels to "give" slightly in relation to each other, either by the slight inward resiliency of the side of the can at the points of the bayonet-lugs, or by the slight resiliency of the bayonet-lugs themselves and their ability partly to ride up on the sides of the bayonet-channels as though they were to ride out of the channels, until the bayonet-lugs have passed the lowermost points 104 of the bayonet-channels 57. In this manner, I may firmly seat the lowermost edge 64 of the can, against the annular portion 105 of the base, while, at the same time, the bayonet-lugs have receded into the slightly up-turned portions 60 of the bayonet-channels 57; at the same time maintaining the seal between 10 and 11 under the influence of the pressure of the up-dished and tensioned annular portion 65 of the can-bottom.

This combination of the outer peripheral seating of the can-edge 64 against the base (as at 105), and the tension-sealing of the center-hole 29 of the can against the gasket 11 on the base, may also be accomplished (or augmented) by providing a continuous or an interrupted resilient peripheral annular seat in the portion 15 of the base, so that the lower edge 64 of the can will be firmly "seated" against the base even after the bayonet-lugs 14 thereof have receded upwardly into the slightly up-turned portions 60 of the bayonet-channels 57, without necessarily relying upon any "give" between the bayonet-lugs and the bayonet-channels while the former pass the lowermost points 104 of the latter; at the same time maintaining the seal between the seat 10 and the gasket 11 under the influence of the downward force of the annular portion 65 of the bottom of the can caused by the tensioning of said portion 65 when it is up-dished by contact between the seat 10 and gasket 11.

Such annular resilient "seat" at 105 in the outer periphery of the dish-like portion 15 of the base B may be provided by a plurality of circumferentially distributed up-struck bowed leaf-springs pressed out of the sheet-metal 20 of the member 15, along its periphery 105, with one end of each such bowed leaf-spring being left integral with the original sheet, and the other end being free to ride and to be supported by the registering portion 106 of the sheet-metal of the lower wall 21 of the base-member 16; such up-bowed leaf-springs being distributed around the periphery more or less equidistantly, and being disposed more or less parallel (or tangent) to the periphery 105 of the base.

I may also form a plurality of generally radially disposed up-struck leaf-springs from the wall 20, with their inner ends left integral with the wall 20 and with their outer ends free of the wall 20 and bowed upwardly a slight extent so as to form resilient fingers extending a sixteenth ($\frac{1}{16}$) or an eighth ($\frac{1}{8}$) of an inch above the surface 105, so as resiliently to engage the can-edge 64.

Instead of drawing the cutter-supporting intake portion 26, out of the metal of the bottom 20 of the upper base-member 15, I may form the cutter-supporting intake member 26 separately, by drawing the same out of a separate piece of sheet metal, as shown particularly in Figures 9 and 10, and then spot-welding or otherwise securing the base flange 67 thereof to the downwardly extending annulus 27 formed around the hole 25 in the wall 20 of the upper base-member 15, as shown, for instance, in Figures 5, 7, 16 and 20 to 23.

The cutter-supporting member 26 has parts of its cylindrical portion cut away to provide large side-openings 68, with vertical leg-like portions 69 intervening, to support the upper inturned flange 70 (see Figures 9, 13 and 14) upon which rests the flat cutter-annulus 71 with its up-turned cutters 73. In Figure 12 this cutter-annulus, with its cutters, is shown in a flat condition, as pressed out of suitable sheet-steel (capable of being tempered to hold a cutting edge), and before the cutters 73 thereof are bent upwardly, hardened and tempered. The cutting edges 72 of the cutters 73 are beveled to a sharp cutting edge, on the inside, so that the sharp cutting edge is preferably at the outer surfaces of the upturned cutters 13.

A plurality of notches 73 may be provided in the cutter-annulus 71, for the reception of the crimping and locking lugs 74 carried at the inner periphery of the in-turned flange 70 of the cutter-supporting member 26 (see Figures 6 and 9 to 14). The cutter-annulus 71 is secured to the flange 70 of the member 26 by bending the lugs 74 upwardly and outwardly into the notches or recesses 73 of the annulus 71, and then pressing the so out-turned lugs 74 tightly against the cutter-annulus, as, for instance, shown in Figure 6. If desired, a disc-ejecting spring 75 (as shown in Figures 5, 7 and 13 to 15) may also be secured in the central opening of the cutter-annulus 71, for the purpose of ejecting the discs 12 (see Figure 1) which have been cut out of the bottom of the cans, so as to prevent these discs from piling up on the top of the central opening 106a in the cutter-annulus 71 and in the cutter-support 26. The spring 75 is preferably of a spiral form, so that it can be pressed "flat" into the plane of its outermost and bottom coil 76. This outermost or bottom coil or turn 76 may be fastened beneath the lugs 74, as shown particularly in Figures 13 and 14. Thus, when the can is pressed down over the cutters, the spring 75 is collapsed "flat" so that it will not interfere with the cutting operation, and when the disc 12 has been fully cut out, then the spring forces the disc upwardly into the body of grease, and away from the central hole 106 in the cutter-annulus 71.

The horizontal dimension (as well as the vertical and diagonal dimensions) of the lateral intake openings 68 are sufficiently less than the diameter of the cut-out disc 12, so that the cut-out disc 12 may not enter any of the openings 68 either in vertical position or in horizontal position or in a position diagonally of the holes 68.

The base "B" may be united by interlockingly crimping or rolling together the lower edge of the base-member 16 and the lower edge of the outer hoop-like member 17, to form either an outwardly extending rolled bead-like seam 19, as in Figures 1, 3, 5, 7, 8, 16 and 20 to 23, or by rolling them inwardly to form a similar inner bead 78, as in Figure 4. The outer hoop-like member 17 may be united with the upper base-member 15, by similarly rolling the upper edges thereof into a bead-like seam 18, which may extend outwardly as in Figures 1, 3, 4, 5, 7 and 17, or may extend inwardly as at 80 in Figures 16 and 18. Likewise, the beads, as, for instance, the upper beads 18 and 80, instead of being hollow round beads, as indicated particularly in Figures 5, 7, 16, 17 and 18, may, instead, be flat, tight-crimped seams, similar to the seam 79 illustrated in Figure 4.

Likewise, instead of the inter-folded or inter-crimped lock-seams 18, 19, 79 and 80, the upper and lower base-members 15 and 16 may be united with the outer hoop-like base-member 17 by welding a continuous line through the two sheets, near their edges, throughout the circle, so as to form a fluid-tight seal.

Instead of (or alternative to) the continuous line-weld to unite the dish-like member 16 to the outer hoop-like member 17, or to unite the upper dish-like member 15 to the hoop-like member 17, I may use a series of circumferentially distributed spot-welds at suitable intervals, to unite the contiguous "skirt-like" portions of 16 and 17 to each other, or to unite the "skirt-like" portions of 15 and 17 to each other. Because the transverse walls 20 and 21 of the dish-like members 15 and 16 may be firmly pressed against each other, at the same time that such spot-welding is accomplished, such spot-welding may, alone, provide sufficiently fluid-tight seal between the transverse walls 20 and 21, to retain the more or less viscous fluid in the channel 28 without leakage, and without dissipating the suction created by the pull of the piston 51 of the barrel of the grease-gun (or the like).

The lower edges of the base-member 16 with the outer hoop-like member 17 may be flared outwardly to a radial extent greater than that of the bead 19, so as to form an outer floor-flange of a half inch or so (more or less), and such flanges may then be seamed together by an inter-folded or inter-crimped lock-seam or by welding or otherwise. Such outwardly extending flange will provide a greater floor-contact area for the base and will also permit the feet of the operator to rest on the flange so as to secure the base to the floor during the application of the can to the base, particularly during the turning required for the cutting operation and the bayonet-locking operation.

The more or less vertical portions 61 of the bayonet-channels 57 may be pressed into the beaded portions 18, 79 and 80, of the upper edge of the base, or they may be similarly pressed into the welded upper edges, where an upper weld-line is used to unite the upper edges of the flange 23 and the member 17 (in place of the beads 18, 79 or 80).

In the embodiment of the invention illustrated in Figures 1, 3, 5, 7, 8 and 17, the upper cylindrical portion of the base (formed of the flange 23 and the upper part of the member 17) telescopically surrounds the lower part of the can C, as illustrated particularly in Figures 1, 5, 7, 8 and 17, while, in the embodiment illustrated in Figures 16 and 18, the bottom of the can telescopes down over (and on the outside of) the top of the base. In the embodiment illustrated in Figures 1, 2, 3, 5, 7, 8 and 17, the inter-folded or inter-crimped lock-seam 8 at the bottom of the can C is preferably rolled inwardly, so that the outermost diameter of such seam 8 will not extend substantially beyond the outer diameter of the can-body, so as to permit the side-wall of the can to be fitted more closely to the inner diameter of the cylindrical wall 23 of the upper base-member 15, and thereby to permit the use of a bayonet-lug 14 of smaller radial extension.

In the embodiment illustrated in Figures 16 and 18, the seam 8 is disposed entirely on the outside of the main can-diameter, so as to leave the inner diameter of the base-projection of the can "flush" so that it may telescope over and on the outside of the upper part of the base, with a closer fit, and thereby to permit the use of the inwardly extended bayonet-projections 14 of minimal radial extent.

While the bayonet-lugs 14 may be pressed or "drawn" from the 2-ply skirt-like portion 77 of the can (as in Figures 5, 7 and 8), by a die-pressing operation, they may also be formed of a separate stamping, or the like, as in Figures 25 to 31, inclusive, and 29 to 31, inclusive, wherein a separate sheet-metal stamping is formed with a bayonet-lug 14 pressed therefrom, with the flange 83 of the stamping spot-welded to the side of the can. By this means a bayonet-lug of greater radial extension may be provided. In either event, however, the bayonet projection 14 is preferably placed at or near the level of the transverse bottom 6 of the can C, so that the bottom of the can will serve as a radial stiffener to prevent the collapsing of the side of the can by the radial pressure incident to the bayonet-locking of the can to the base.

In Figures 29 to 31 inclusive, a more-or-less elongated bayonet-lug is illustrated. This elongated lug may be used where it is desired to obtain a broader contact surface between lug and bayonet-channel, particularly in the final or locked position of the can and base, where the bayonet-lug rests in the slight upturned terminal portion 60 of the bayonet channel. In this embodiment, the bayonet channels are made wider in their down-portions, as, for instance, in the portions 61 and 63 thereof, to accommodate the greater circumferential extent of the bayonet-lug, as shown particularly in Figure 28. Such elongated bayonet-lug (as distinguished from the round bayonet-lug) may be either formed separately as in Figures 30 and 31, inclusive, or may be formed integral with the side of the can by being pressed or drawn from the 2-ply skirt portion 77 thereof.

Where the separate bayonet-lugs are used, that is bayonet-lug members formed separately and then welded or otherwise secured to the side of the can, the bayonet lugs are preferably applied at a level so that the lug or the flange 83 thereof will straddle the line of the bottom 6 of the container.

In Figures 16 and 19 a dual or 2-way acting valve is shown, for the gun-receiving socket 30, wherein the inwardly opening valve disc 40—a (corresponding to the valve-disc 40 in the exemplifications heretofore described) is perforated as at 85, and provided with a central aperture 86, through which the valve-stem 43 may freely and slidably pass. The valve-stem 43, in this embodiment, is preferably of a diameter slightly less than the diameter of the valve-extension 47, and a second valve-disc 53—a, corresponding generally to the valve 53 in the embodiments heretofore described, is interposed between the valve-extension 47 and the valve-stem 43; the diameter of the disc 53—a being sufficient to cover the apertures 85 in the valve-disc 40—a. The outwardly closing valve-spring 46 (corresponding to the valve-spring 46 in the embodiments heretofore described) is here interposed between the valve-disc 40—a and the guide-bracket 45, while a second spring 87 is interposed between the other side of the guide-bracket 45 and the enlarged inner end 88 of the valve-stem 43, so as to pull the valve-disc 53—a against the valve-disc 40—a.

By this means the passageway 28 may be "un-valved" either by the suction created by the piston 51, or by the action of the button 48, when the barrel of the grease-gun is screwed into the socket 30. This, in this form of construction (illustrated in Figures 16 and 19) the dispensing apparatus of the present invention may be operated either by a grease-gun having a valve-opening or valve-depressing member, like or similar to the member 48 (Figures 7 and 8) or it may be operated by a grease-gun barrel without such member (as, for instance, illustrated in Figure 16).

In place of any valve, one or more baffles 89 may be placed in the conduit 28 (as illustrated in Figure 23), preferably in staggered relation to each other, so as to give some resistance to the flow of grease thereby to prevent the free spilling of the grease, when the grease-gun barrel 37 is unscrewed from the socket 30, and before the socket can be closed off by a screw-plug or other closure means.

Likewise a flow-limiting orifice-plate may be placed in the conduit 28, to prevent free flow and yet permit suction-induced or pressure-induced flow.

After the can C has been applied to the base B in the manner hereinabove indicated (by causing the bayonet-lugs 14 thereof to traverse through the entire extent of the bayonet grooves 57 of the base and thereby cutting a central opening in the bottom of the can and sealing the same to the base, and interlockingly securing the can to the base) the screw 93 is unscrewed, and removed from the central aperture in the dome-like portion 97 of the lid or cover 3 of the can, thereby creating a vent hole in the top of the lid, so as to permit air freely to enter the container, above the follower. Thereafter, by applying the barrel of the grease-gun to the socket 30, and pulling the piston 51 of the barrel backward, the grease is sucked out of the container through the intake member 26 of the base, through the radial passageway 28 and out through the socket 30, thereby filling the grease-gun barrel.

While in the drawings I have shown the bayonet-projections formed on the side of the can or pail, with the bayonet-channels or grooves formed in the base, I may also, as an alternative embodiment of the present invention, form the bayonet-channels or grooves in the 2-ply skirted bottom portion of the container or pail, and form the corresponding bayonet-projections on the base.

In either form of construction, the tensioning of the bottom of the container or pail, when the opening has been formed therein and when the container or pail has been secured to the base, serves to prevent or retard the unlatching or the disengagement of the container and base, in respect to each other.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. A fluid-dispensing base for suction-dispensing viscous fluids through the bottom of a top-vented thin-walled original vendable merchandising container, said base adapted to receive and detachably to engage an original vendable merchandising container containing a more or less viscous grease or like fluid, and said base having a bottom portion adapted to rest on a floor or like generally horizontal surface, and a generally co-axial upper container-receiving seat, container-gripping means extending upwardly from said container-receiving seat near its outer periphery and adapted to engage a generally cylindrical sheet-metal container approximately at the outer diameter of its bottom, an upper inlet opening in said container-receiving seat, a suction-receiving socket on the side of said base for sealingly receiving and for making quick-attachable and detachable engagement with the intake end of the barrel of a grease-gun or like suction-producing device, a conduit inter-connecting said inlet-opening and said suction-receiving socket and in communication therewith, a cutter carried by said base in operative juxtaposition to said inlet-opening and adapted to form an opening in the bottom of the container generally in registration with said inlet-opening, and means on said container-receiving seat for sealing the joint between the inlet-opening and the opening in the bottom of the container, said container-gripping means being so arranged that the container may be rotated about its axis, through a suitable angle, upon the base, after it has been interlockingly engaged by said container-gripping means, thereby to cause said cutter to cut, and that upon the final rotation of the container upon the base, after it has been interlockingly engaged by the container-gripping means, said container-gripping means will further draw the container down onto the container-receiving seat of the base and tighten the fluid-seal as a result of such final rotation.

2. Lubricant-dispensing apparatus for suction-dispensing viscous fluids through the bottom of a top-vented thin-walled original vendable merchandising container, comprising a base adapted to receive and detachably to engage an original vendable merchandising container containing a more or less viscous grease or like fluid, said base having a bottom portion adapted to rest on a floor or like generally horizontal surface, and an upper container-receiving portion adapted to hold a generally cylindrical container in a generally upright position and including an outer peripheral container-seat adapted to receive the bottom beaded peripheral seam of a container, and a fluid-sealing seat generally coaxially disposed with respect to said outer peripheral container seat, but at a level so substantially higher than the level of said peripheral seat that the bottom of the container will be contacted thereby and deflected and stressed upwardly before the outer beaded periphery of the bottom of the container seats against said peripheral container seat, an inlet-opening through said upper container-receiving portion, said inlet-opening having fluid-sealing means, a suction-receiving socket on the side of said base for sealingly receiving and for making quick-attachable and detachable engagement with the intake end of the barrel of a grease-gun or like suction-producing device, a conduit extending through said base and connecting said inlet-opening with said suction-receiving socket, and container interlocking means carried by said base near the outer periphery of said base, for detachably securing a generally cylindrical container to said base with its bottom in sealing contact with said fluid-sealing means and in an upwardly deflected and stressed condition.

3. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, and a socket on the side of said transfer-base in communication with said conduit.

4. A gun-loading transfer-base for dispensing viscous lubricants and other viscous fluids through the bottom of a thin-walled original vendable merchandising container, said base including a bottom portion and an upper container-receiving portion, an inlet-opening in said container-receiving portion, a socket on the side of said base, a conduit intermediate said socket and said inlet-opening, a dual valve arranged normally to shut off the flow of fluid through said conduit and said dual valve including a valve-element adapted to unseat by an inward motion and another valve-element adapted to unseat by an outward motion, the first-named valve-element having a valve-operating extension extending outwardly to within reach of valve-depressor to be carried by gun to be loaded and to be applied to said socket; the outwardly opening valve element being adapted to be unseated by suction from the gun or fluid-pressure from within the conduit.

5. A gun-loading grease-transfer container-base including container-gripping means on the base for interlocking with a container, an inlet opening on the top of the base, container-cutting means in operative juxtaposition in the inlet opening also carried by the base, a seal surrounding the inlet opening, said container-cutting-means and seal being so related to said interlocking means that actuation of the interlocking means causes operation of said container-cutting means to form an opening in the container and effect a seal around said opening, a screw-threaded suction-receiving socket on the side of the base, and a conduit extending from said inlet opening to said socket, whereby an original container of grease may be mounted on the base and a hole formed therein and sealed to the base and the reservoir barrel of a grease gun may be temporarily engaged with the socket for filling the barrel from the container.

6. A gun-loading grease-transfer container-base including container-gripping means on the base for interlocking with a container, an inlet opening on the top of the base, container-opening means in operative juxtaposition to the inlet opening also carried by the base, a seal surrounding the inlet opening, said container-opening means and seal being so related to said interlocking means that actuation of the interlocking means causes operation of said container-opening means to form an opening in the container and effect a seal around said opening, a suction-receiving socket on the side of the base for receiving and making quick-attachable and quick-detachable engagement with the intake end of a suction-producing barrel-and-piston of a portable grease-gun, and a conduit extending from said inlet opening to said socket, whereby an original container of grease may be mounted on the base and a hole formed therein and sealed to the base and the reservoir-barrel of a grease-gun may be temporarily engaged with the socket for filling said barrel from said container.

7. A gun-loading grease-transfer container-base including container-gripping means on the base for embracing and interlocking with a container at its periphery, an inlet opening on the top of the base, container-opening means in operative juxtaposition to the inlet opening also carried by the base, a seal surrounding the inlet opening, said container-opening means and seal being so related to said interlocking means that actuation of the interlocking means causes operation of said container-opening means to form an opening in the container and effect a seal around said opening, a suction-receiving socket on the side of the base for receiving and making quick-attachable and quick-detachable engagement with the intake end of a suction-producing barrel-and-piston of a portable grease-gun, and a conduit extending from said inlet opening to said socket, whereby an original container of grease may be mounted on the base and a hole formed therein and sealed to the base and the reservoir-barrel of a grease-gun may be temporarily engaged with the socket for filling said barrel from said container.

8. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, an outwardly-opening suction-operated valve in said conduit, and a socket on the side of said transfer-base in communication with said conduit.

9. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, an outwardly-opening suction-operated valve at the outer end of said conduit, and a socket on the side of said transfer-base in communication with said conduit.

10. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, an outwardly-opening suction-operated valve at the inner end of said conduit, and a socket on the side of said transfer-base in communication with said conduit.

11. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, a socket on the side of said transfer-base in communication with said conduit, said inlet member having a cutter-supporting portion and fluid-passageways extending therethrough, said cutter-supporting portion including locking tabs for locking the cutter to the inlet member to prevent rotational and axial displacement therebetween.

12. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, a socket on the side of said transfer-base in communication with said conduit, said inlet member having a cutter-supporting portion and fluid-passageways extending therethrough, said cutter-supporting portion including locking tabs for locking the cutter to the inlet member to prevent rotational and axial displacement therebetween, said cutter comprising a cutter-annulus resting upon said cutter-supporting portion, said annulus being held in place by said tabs, and a plurality of pointed cutters bent up from said annulus.

13. A gun-loading transfer-base for dispensing viscous lubricants and other viscous fluids through the bottom of a thin-walled original vendable merchandise container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, a socket on the side of said transfer-base in communication with said conduit, said inlet member having a cutter-supporting portion and fluid-passageways extending therethrough, said cutter-supporting portion including locking tabs for locking the cutter to the inlet member to prevent rotational and axial displacement therebetween, and an ejector spring carried by said inlet member.

14. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, a socket on the side of said transfer-base in communication with said conduit, said inlet member having a cutter-supporting portion and fluid-passageways extending therethrough, said cutter-supporting portion including locking tabs for locking the cutter to the inlet member to prevent rotational and axial displacement therebetween, and an ejector spring carried by said inlet member, said locking tabs also securing said ejector spring in place.

15. A gun-loading transfer-base for dispensing viscous lubricants and other viscous fluids through the bottom of a thin-walled original vendable merchandising container, said base having a bottom portion and an upper container-receiving portion, each of said portions being a dished sheet-metal member with their bottoms facing each other and with their flanges extending in opposite directions and being firmly united to each other, an inlet member projecting upwardly from the upper container-receiving portion, a cutter carried by said inlet member, a sealing element surrounding said inlet member at its lower basal zone, a conduit formed between said two dished members and extending from said inlet member to the side of said transfer-base, stationary means for impeding fluid-flow within said conduit, and a socket on the side of said transfer-base in communication with said conduit.

EDWIN P. SUNDHOLM.

REFERENCES CITED

The following references are of record in the file of this patent:

UNITED STATES PATENTS

| Number | Name | Date |
|---|---|---|
| 1,557,861 | Moreida | Oct. 20, 1925 |
| 1,613,898 | Metcalf et al. | Jan. 11, 1927 |
| 2,025,232 | Dodge | Dec. 24, 1935 |
| 2,074,503 | Dodge | Mar. 23, 1937 |
| 2,103,063 | Clark | Dec. 21, 1937 |
| 2,156,869 | Rickert | May 2, 1939 |
| 2,203,710 | Young | June 11, 1940 |
| 2,239,581 | Sundholm | Apr. 22, 1941 |
| 2,258,636 | Young et al. | Oct. 14, 1941 |
| 2,268,592 | Hothersall | Jan. 6, 1942 |
| 2,305,841 | Carlson | Dec. 22, 1942 |